United States Patent [19]

Hallworth

[11] Patent Number: 4,781,781

[45] Date of Patent: Nov. 1, 1988

[54] FORMATION OF SOLID POLYMERIC MATERIAL

[76] Inventor: Gerald Hallworth, 27 Nuttall Hall Rd., Ramsbottom, Lancashire, England

[21] Appl. No.: 89,855

[22] Filed: Aug. 27, 1987

Related U.S. Application Data

[62] Division of Ser. No. 828,529, Feb. 12, 1986, Pat. No. 4,722,954.

[30] Foreign Application Priority Data

| | | | |
|---|---|---|---|
| Feb. 14, 1985 | [GB] | United Kingdom | 8503859 |
| Apr. 9, 1985 | [GB] | United Kingdom | 8509051 |
| Dec. 30, 1985 | [GB] | United Kingdom | 8531895 |

[51] Int. Cl.[4] .......... C08J 3/20; C08J 9/00; C08K 3/36; C08C 1/06

[52] U.S. Cl. .......... 156/328; 427/385.5; 427/389; 427/389.9; 427/393; 521/65; 521/71; 521/91; 524/23; 524/55; 524/522; 524/525; 524/552; 524/559; 524/563; 524/51; 524/571; 524/575; 428/95

[58] Field of Search .......... 427/389.9, 385.5, 389, 427/393; 156/328; 524/55, 23, 575; 428/95; 521/65, 71, 91

[56] References Cited

U.S. PATENT DOCUMENTS

| | | | |
|---|---|---|---|
| 2,352,463 | 6/1944 | Wenzelberger et al. | 524/55 |
| 2,517,737 | 8/1950 | Travis | 524/55 |
| 2,909,278 | 10/1959 | Blackford | 524/493 |
| 3,904,566 | 9/1975 | Cudby | 524/437 |
| 3,925,271 | 12/1975 | Balinth | 524/492 |
| 3,933,579 | 1/1976 | Kershaw et al. | 521/64 |
| 4,077,809 | 3/1978 | Plunguian et al. | 524/8 |
| 4,094,685 | 6/1978 | Lester | 521/76 |
| 4,157,322 | 6/1979 | Colegrove | 523/129 |
| 4,179,298 | 12/1979 | Nelson et al. | 521/77 |
| 4,232,136 | 11/1980 | Marquisee | 521/65 |
| 4,350,785 | 9/1982 | Habib | 524/55 |
| 4,356,819 | 11/1982 | Potaczek | 524/55 |
| 4,476,276 | 10/1984 | Gasper | 524/493 |
| 4,505,976 | 3/1985 | Doehnert et al. | 524/55 |
| 4,537,915 | 8/1985 | Oberle et al. | 521/70 |
| 4,585,826 | 4/1986 | Graves | 524/493 |
| 4,626,567 | 12/1986 | Chang | 524/493 |
| 4,647,618 | 3/1987 | Bauman et al. | 521/65 |
| 4,722,954 | 2/1988 | Hallworth | 524/55 |

FOREIGN PATENT DOCUMENTS

| | | | |
|---|---|---|---|
| 0520794 | 1/1956 | Canada | 524/493 |
| 800051 | 11/1968 | Canada | 524/493 |
| 1240652 | 5/1967 | Fed. Rep. of Germany | 524/493 |
| 3021693 | 12/1981 | Fed. Rep. of Germany . | |
| 0078074 | 6/1980 | Japan . | |
| 0011863 | 1/1982 | Japan | 524/5 |
| 0092557 | 6/1982 | Japan | 524/5 |
| 0002375 | 1/1983 | Japan | 524/493 |
| 0202279 | 11/1984 | Japan | 524/5 |
| 1220387 | 1/1971 | United Kingdom . | |
| 2069477 | 8/1981 | United Kingdom | 524/5 |
| 1604215 | 12/1981 | United Kingdom . | |

*Primary Examiner*—Herbert J. Lilling
*Attorney, Agent, or Firm*—Fisher, Christen & Sabol

[57] ABSTRACT

A solid flexible polymeric material is formed by solidifying a water-based latex which contains an inorganic filler. The filler is sand and this may be stabilized in the latex with xanthan gum. The solid material may be a foamed or non-foamed layer which may be used as integral carpet backing, as carpet underlay, or as an adhesive for bonding a reinforcing fabric to the back of carpeting.

8 Claims, 1 Drawing Sheet

FORMATION OF SOLID POLYMERIC MATERIAL

Figure 1:
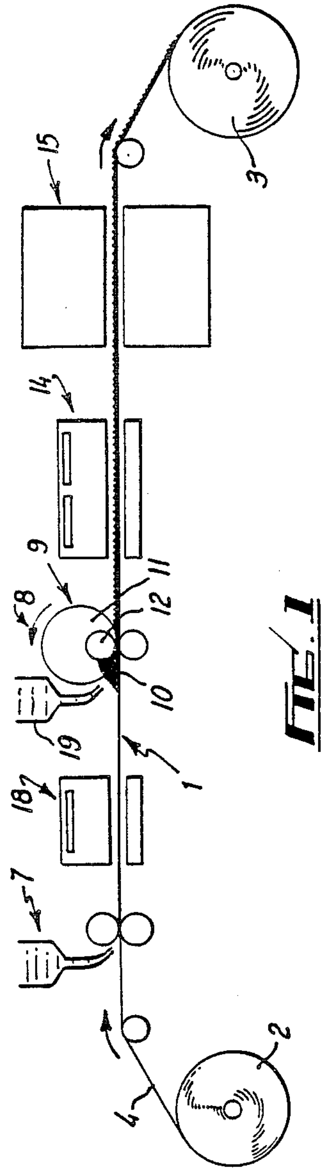

This is a division of application Ser. No. 828,529, filed Feb. 12, 1986, now U.S. Pat. No. 4,722,954.

This invention relates to the formation of solid polymeric material particularly flexible polymeric layers for carpet backing and underlay.

It is well known to make underlay and foam backing for carpets from a water-based latex, i.e. an aqueous emulsion or dispersion containing natural rubber and/or one or more other polymers such as styrene-butadiene rubber dispersed in a water phase. The latex is mixed with various additives including a foaming agent such as a soap or surfactant and is mechanically foamed e.g. by whipping and/or by injection of compressed air or other gas. The foamed latex is spread over the back surface of carpeting material, or over a scrim or support surface in the case of underlay, and the resulting layer is set or stabilised and then dried and cured or vulcanised by heating in an oven. In the so-called non-gel process the layer of foamed latex is set by application of a coagulating solution or by surface heating which removes water by evaporation. In an alternative process, known as a gel process, the latex is mixed with a gelling agent so that stabilisation by gelling occurs prior to drying and curing.

For reasons of cost the latex is usually mixed with an appreciable proportion of a relatively inexpensive inorganic filler such as finely divided calcium carbonate (whiting or limestone), china clay, and the like. However, very high proportions of these known fillers are not feasible because the resulting material has poor shear strength and readily crumbles and tends to crack on flexing.

It is also well known to make carpet tiles by forming a thin layer of resilient non-foamed polymeric material on the back of a sheet of carpeting material. A water-based latex of the kind described above is used and this is applied in a viscous state to the carpeting material and is then dried and cured to form the resilient polymeric layer. Inorganic fillers are commonly incorporated and, as with the above described foamed material, very high proportions or filler give rise to problems of poor shear strength, crumbling and cracking on flexing. Similar problems also arise with industrial and commercial flooring comprising carpeting material backed with a flexible coating formed from a filled latex composition.

A well-known relatively inexpensive kind of carpeting material comprises a tufted fabric having a back surface which is bonded to an open weave jute reinforcing fabric. With one arrangement, the bonding is effected with a layer of latex adhesive which is thick enough to penetrate both the back surface of the tufted fabric and the jute reinforcing fabric. The adhesive layer is formed from a water-based latex of the kind described above which is often lightly foamed. After application of the viscous latex mixture to the tufted fabric back surface the jute fabric is pressed into the latex and the latter is then set and cured by drying. With another arrangement, the back surface of the tufted fabric is first coated with a water-based latex to lock the tufts in position. The jute reinforcing fabric is then provided with a thin layer of a water-based latex adhesive which may be lightly foamed and this is pressed onto the coated back surface of the carpeting to bond the two fabrics together, the adhesive layer then being set and cured by drying. To reduce costs it is known to incorporate an inert inorganic filler such as limestone in the latex adhesive for both the above arrangements. However, limestone acts to reduce the adhesive properties of the latex. Also with high proportions of limestone the cured adhesive layer has poor shear strength and tends readily to crumble and crack on flexing. Accordingly limits are imposed on the proportion of filler which it is feasible to use.

One object of the present invention is to provide a method of forming a solid flexible polymeric material which contains a high proportion of an inexpensive filler yet which has good shear strength and has good resistance to crumbling and cracking on flexing.

A further object of the invention is to provide a solid flexible polymeric material which contains a high proportion of an inexpensive filler yet which can be obtained from a composition having good adhesive properties.

According to one aspect of the invention therefore there is provided a method of forming a solid flexible polymeric material wherein a water-based latex is mixed with an inorganic filler and the mixture is then solidified, characterised in that the inorganic filler comprises sand.

Surprisingly, the resulting material can demonstrate excellent shear strength even with relatively high proportions of sand. Moreover, good flexibility can be achieved with little tendency to crumble or crack. Also, such a material can be obtained from a composition which demonstrates excellent adhesive properties despite the presence of the sand.

By way of example, in the case of a styrene-butadiene rubber latex of the kind commonly used in carpet manufacture, for a carpet backing adhesive layer it may be possible to use 150 to 700 or 800 parts sand per 100 parts by weight polymer to achieve the same adhesive properties as with 50 to 300 or 400 parts limestone, and for a foamed carpet backing or underlay it may be possible to use 100 to 450 parts sand per 100 parts by weight polymer to give shear strengths and resistance to crumbling and cracking on flexing comparable with those obtained with up to 200 parts by weight limestone.

The polymeric material of the invention is formed from a water-based latex, i.e. an aqueous emulsion or suspension containing one or more polymers dispersed in a water phase.

In particular, suitable latices are those which are used in the manufacture of resilient solid foamed and non-foamed material e.g. for carpet backing and underlay and which comprise one or more polymers or copolymers capable of forming an emulsion or dispersion in water which is storage stable or at least which can be maintained as a stable homogeneous dispersion for an appreciable period of time sufficient for the purposes of utilisation thereof and which can be solidified particularly by drying and curing.

Thus the latex may contain natural rubber and/or a synthetic rubber such as styrene-butadiene rubber which is a copolymer of styrene and butadiene typically containing say 10% to 65% by weight styrene and which can be cured by sulphur vulcanisation. Additionally or alternatively one or more other polymers or copolymers preferably although not necessarily of an elastomeric nature, and which can be cured by sulphur vulcanisation or by self-cross-linking on heating or otherwise, may be used. Examples include: carboxylated styrene-butadiene rubber, polyvinylchloride, ethylene vinylacetate copolymer, polychloroprene, acrylic copolymers (styrene acrylate copolymer, vinylacetate acrylate copolymer etc), butadiene-acrylonitrile copolymer.

The latex may contain say 25–72% by weight solid polymeric material dispersed in water, particularly say 50–66%, although the actual proportion will depend on the nature of the polymer and the intended application. Thus, for example, a styrene-butadiene latex for foam production may have 63–72% solids whereas an acrylic latex for adhesive use may have 40–66% solids. To achieve or maintain the desired stable emulsion, in accordance with conventional practice, the latex may contain a small amount (say about 1% by weight) of a suitable emulsion stabilising agent or thickener such as a surfactant, methyl cellulose, polyvinyl alcohol, sodium polyacrylate, or other suitable substance.

The latex may be mixed with substances additional to the sand depending on required properties, the nature of the polymeric material, and the kind of process relied on for the solidification of the material.

Thus, where a gel process (as referred to above) is used to produce a solid foam material, the latex may be mixed with a foaming agent particularly a soap or surfactant such as sodium lauryl sulphate, metal salts of palmitic, oleic and linoleic acid, and a gelling agent may be added before or after the latex is foamed. The gelling agent may be of the kind which becomes automatically effective after a short elapse of time. A well-known gelling agent of this kind is sodium silicofluoride which undergoes chemical reaction and causes phase reversal by acidification (i.e. so that the water phase becomes dispersed in the polymer phase and can then be readily removed by drying). Alternatively a gelling agent such as ammonium acetate which requires heat activation may be used. The latex may also be mixed with one or more other ingredients such as an antioxidant (e.g. alkylated phenol), a vulcanising agent (where the polymeric material requires the presence of this for cross-linking purposes) such as sulphur, a vulcanising accelerator if appropriate such as zinc diethyldithiocarbamate with mercaptobenzthiazole, a vulcanising activator if appropriate such as zinc oxide, a sequestering agent such as a phosphate (e.g. sodium hexametaphosphate), an alkali such as ammonia or potassium hydroxide to adjust pH to an alkali level to avoid premature foam coagulation, a foam stabilising agent or thickener (which may be one or more of the above described emulsion stabilising agents), a pigment, and if desired, an additional filler such as whiting.

Where a non-gel process (as referred to above) is used to produce a solid foam material, the latex may be mixed with a foaming agent particularly a soap or surfactant which preferably is such as to perform an efficient stabilising action. A well-known efficient foaming agent is disodium alkyl sulphosuccinamate used alone or in combination with other surfactants such as sodium lauryl sulphate and lauryl ether sulphate. The latex may also be mixed with one or more other ingredients such as an antioxidant, a vulcanising agent, a vulcanising accelerator, a vulcanising activator, a sequestering agent, an alkali, a foam stabilising agent, a pigment, additional filler, all as described above with reference to the gel process.

The mixture of ingredients for both the gel and non-gel processes will be selected in accordance with conventional practice so that the mixture as subjected to mechanical foaming comprises a stable emulsion which forms a stable foam which has a viscosity which is low enough to enable the foam to be readily applied to a surface to form a layer and which is high enough to enable the layer to be retained at the requisite thickness on the surface until the foam is set and can be cured. The viscosity suitably may be in the range 1000 to 35,000 cps for the mixture prior to foaming, the actual value depending on the degree of foaming and the method of application to the surface. Where a high degree of foaming is required a low viscosity will be appropriate since foaming gives rise to an increase in viscosity. Where the foamed material is to be spread over the surface the viscosity should be low enough to permit ready pourability or spreadability. Where the foamed material is to be applied from a pattern roller or the like as described hereinafter, a high viscosity may be appropriate.

The solids content of the latex mixture is an important factor particularly in ensuring that the foamed material can be set, dried and cured without undesirable collapse or disruption of the cellular structure. Preferably the solids content is adjusted to at least say 55% by weight up to say 85%.

The invention is not intended to be restricted to the conventional gel and non-gel processes and other methods may be suitable. For example, there is a known foam-forming process which involves chemical foaming of a latex (e.g. with hydrogen peroxide and a delayed action catalyst). Also it is known to set the foam prior to drying and curing by freezing followed by treatment with a coagulant such as carbon dioxide gas (which coagulates by acidification); and some or all of these steps may be applicable to the present invention.

Moreover it is to be understood that the invention is not intended to be restricted to the production of foamed materials. The invention equally well applies to non-foamed materials, for example in the formation of resilient layers, or coatings. Also the polymeric material of the invention may be used as a foamed or non-foamed adhesive layer as mentioned above. In the case of non-foamed material, the above described latices may be used if desired mixed with additives including one or more of an antioxidant, a sequestering agent, a vulcanising agent, a vulcanising accelerator, a pigment, an alkali to adjust pH, additional filler, all as described above with reference to the gel process. Generally, a higher viscosity level may be required and this may be achieved by incorporation of a thickener such as sodium polyacrylate or other substance or combinations of substances e.g. selected from the above foam stabilising agents.

It is visualised that the invention will find particular application in the manufacture of carpeting or underlay in which case the polymeric material of the invention may constitute an integral foam backing of foam-backed carpeting, or an integral non-foamed backing e.g. of carpet tiles, or an integral non-foamed rear coating or backing layer of commercial or industrial carpeting, or it may constitute an adhesive layer which holds a backing material to the back surface of carpeting, or it may constitute a foam layer which wholly constitutes or forms part of underlay.

In the case of integral foam backing, the layer may be formed in situ on the back surface of carpeting by spreading the above described foamed latex mixture over such surface. In conventional manner this may be effected by feeding the mixture from a pipe onto the back surface of an advancing continuous strip of carpeting and doctoring the mixture to give a regulated thickness. Alternatively the latex mixture may be applied from a transfer member such as a roller and this may be patterned so that a desired pattern or texture is imparted to the resulting foamed layer. Reference is made to my copending application of even date and common priority for further description of this arrangement.

In the case of underlay, the latex mixture may be applied to a reinforcing scrim (where the underlay is to incorporate such material) or to a release sheet (where the underlay is to consist wholly of the foamed material) and the procedure used may be as described above in relation to the formation of an integral carpet backing.

In the case of an adhesive layer the latex mixture may be applied to the back surface of carpeting e.g. to the back surface of a tufted carpeting fabric so that the mixture penetrates the back surface and establishes a layer thereon, a backing material such as an open weave jute fabric or other material then being placed or pressed on top of this layer. The adhesive layer may act to bond the carpet tufts in position. Alternatively a thin coating of a different adhesive material (e.g. a conventional latex mix not containing sand) may be first applied to lock the tufts in position, and the adhesive layer may then be applied to this coating or to the backing material before pressing the backing material into position.

With regard to the sand which is incorporated in the polymeric material of the invention this may be of any suitable form and may be added in wet or dry state. By sand is particularly meant a naturally granular material which is graded but not subjected to any mechanical crushing or grinding operation to obtain the required size of granules, whereby the granules are naturally relatively hard and dimensionally stable. The sand may be principally silicious (crystalline quartz) or may be only partially silicious. For example the sand may be a Belgian Silica Sand or a Glass Sand or a Foundry Sand as sold by British Industrial Sands Limited and which is substantially wholly silica (i.e. more than 95% silica). Alternatively the sand may be a Norwegian Olivine or Australian Zircon as sold by British Industrial Sands Limited, the principal ingredients of the former being 41.5 to 42.5% silica, 6.8 to 7.3% ferric oxide, 48.5 to 51.0% magnesium oxide, and the principal ingredients of the latter being 32.8% silica and 66.4% zirconium. The particle size of the sand is preferably graded and in the range 75μ to 300μ (50 to 200 British Standard mesh), particularly 150 to 300μ. The sand is preferably in the range 50 to 450 parts preferably 100–450 by weight per 100 parts polymer in a foamed system and 150–1200 preferably 150–800 parts in a non-foamed system.

As mentioned, conventional inorganic fillers are commonly finely ground relatively soft smooth particled materials based on calcium carbonate or silicates (e.g. whiting or china clay). In accordance with the present invention it has been found, surprisingly, that the relatively hard crystalline particles of sand impart significantly different physical properties and flexibility and cohesive strength without disruption or disintegration can be maintained at much higher levels of filler than is the case with the conventional materials. Without intending to restrict to any particular explanation for the surprising action of the sand, it seems possible that the reason may be that the sand can be maintained as a separate dispersed filler within the polymeric matrix whereby the flexibility of the matrix is essentially unchanged whereas convention fillers tend to become incorporated as a disruptive structural part of the matrix.

Especially where high proportions of sand are used it is important to ensure that the sand is held in relatively homogeneous dispersion in the above described latices before setting of the latex mixture. With a view to facilitating this, the latex mixture preferably incorporates a suitable natural or synthetic gum or thickening agent which acts to hold the sand in dispersion whilst retaining requisite fluency of the mixture. It will be appreciated that there is inherent difficulty in maintaining a high proportion of sand in a stable dispersion. Surprisingly it has been found that one particular gum, namely Xanthan gum is especially effective in this respect. In particular with this gum it is possible to stabilise the sand without unduly increasing the viscosity. Xanthan gum is a natural high molecular weight branched polysaccharide which functions as a hydrophilic colloid to thicken, suspend and stabilise water-based systems. Other substances may be possible such as modified starches, alginates etc. at least as supplements to the Xanthan gum. For example sodium carboxymethyl cellulose may be used with the gum. The proportion of Xanthan gum used depends on the size of the sand particles and may be in the range 0.1 to 3.0 parts per 100 parts polymer by weight. With 300μ particles about 0.9% xanthan gum based on the water phase may be used.

The invention will now be described further with reference to the accompanying drawings and with reference to the following Examples.

Figure 2:
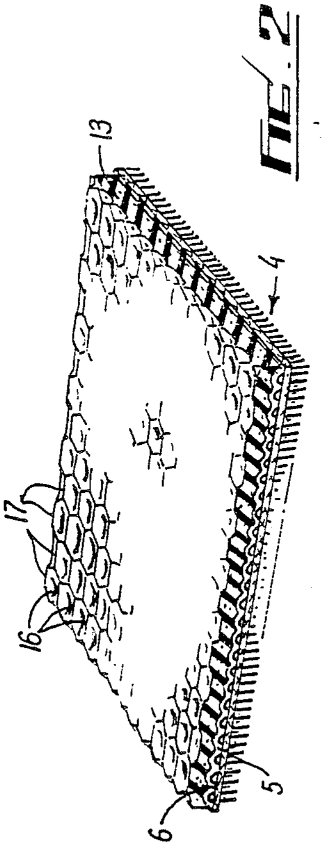

In the drawings:

FIG. 1 is a schematic representation showing different stages in the manufacture of backed carpeting according to the invention; and FIG. 2 is a diagrammatic view showing the structure of the carpeting.

With reference to FIG. 1 tufted carpeting 1 is fed from a supply roll 2 through successive treatment stations to a take-up roll 3. The carpeting 1 on the supply roll comprises a layer of tufted fabric 4 and this is provided with a thin coating 5 on its back surface 6 at a first treatment station 7. The coating material may be applied in any suitable manner e.g. by spraying or roller application and comprises an adhesive which sets to hold the carpet tufts securely in position on the back surface 6 of the fabric layer 4. The adhesive may comprise a water-based styrene-butadiene rubber latex and this is heated in an oven 18 to promote setting.

At a subsequent treatment station 8 the carpeting is passed beneath a large drivably rotated applicator roll 9 having an internal roller 12. The roll 9 has a cylindrical perforated body 11 and a fluent foam-forming mixture 10 is fed to the roll 9 so as to form a dam of the mixture between the roller 12 and the carpeting 1 through the body 11 across the width of the carpeting.

EXAMPLE 1

The foam-forming mixture 10 is formed by mixing the following main ingredients (in parts by dry weight):

Styrene-butadiene rubber latex: 100.00
Disodium alkyl sulphosuccinamate (soap): 4.00
Sulphur (curing agent): 2.00
Sodium hexametaphosphate (sequestering agent): 0.50
Zinc diethyldithiocarbamate (curing accelerator): 1.50
Mercaptobenzthiazole (curing accelerator): 0.50
Antioxidant (alkylated phenol): 1.00

Zinc Oxide (curing activator): 1.50
Sand: 350.00
Xanthan gum: from 0.1
Water: to 78% by weight total solids The resulting mixture is a stable dispersion which is viscous but readily pourable. The mixture is mechanically foamed in conventional manner with compressed air in the apparatus 19 used to feed the mixture to the roll 9.

The roll 9 is rotated with the same peripheral speed as the carpeting 1 and within the roll 9 the smaller roller 12 slides in contact with the inner surface of the body 11. The result of this is that the mixture is pressed by the solid parts of the roll body 11 onto the carpeting and forms a thin coating layer 13 on the back surface of the carpeting having a pattern determined by the roll solid parts. Excess mixture passes through the perforations and returns to the dam. The coating layer 13 is then heat set in a heating zone 14 and then passed through an oven 15 to dry and cure the layer 13.

As shown in FIG. 2, the pattern of the coating layer 13 is generally of mesh or open-weave structure and the layer may be yellow/brown pigmented (or may naturally have this colouration derived from the sand) whereby it simulates a natural woven jute backing. The material of the coating layer is strong and hardwearing and has good flexibility whilst providing adequate support for the fabric layer 4 of the carpeting. The carpeting is of particularly good appearance and feel.

As indicated in FIG. 2, the insubstantial nature of the coating layer 13 may be such that in the holes or hollows 16 between raised parts 17 of the pattern there may be insufficient material to cover to any appreciable extent the adhesive coated threads of the back surface 6 of the fabric layer 4.

Example 1 constitutes an outline formulation which illustrates in general terms the method of the invention. Further Examples of a more detailed nature are as follows. All parts are by weight dry. The ingredients are generally used wet and the percentage solids content of the wet ingredient is given in brackets.

EXAMPLE 2

A foam material was made by a non-gel process from the following ingredients using the procedure of Example 1.

Styrene-butadiene rubber latex (I): 100.00 (65)
Dialkyl sodium sulphosuccinamate (III): 3.50 (35)
Sodium hexametaphosphate (IV): 0.50 (20)
Antioxidant (II): 1.00 (100)
Zinc oxide: 2.00 (50)
Sulphur: 2.00 (50)
Zinc diethyldithiocarbamate: 1.25 (50)
Xanthan gum: 0.75 (4)
Sand 95 mesh (BS) BIS Foundry Sand: 50.00 (100)
Potassium hydroxide: 0.40 (20)
Total Solids Content 64.93%, pH 11 to 12, Viscosity 7000 cps as measured on a Brookfield viscometer model RVT spindle 4 speed 20.

A foamed layer was formed which had good shear strength and did not readily crumble.

EXAMPLE 3

A foam material was made by a non-gel process from the following ingredients using the procedure of Example 1:

Styrene-butadiene rubber latex (I): 50.00 (65)
Dialkyl sodium sulphosuccinamate (III): 5.00 (35)
Natural rubber latex: 50.00 (60)
Sodium hexametaphosphate (IV): 1.00 (20)
Antioxidant (II): 1.00 (100)
Zinc oxide: 2.00 (50)
Sulphur: 2.00 (50)
Zinc diethyldithiocarbamate: 1.00 (50)
Mercaptobenzthiazole: 1.00 (50)
Xanthan gum: 1.00 (4)
Sand 50 mesh (BS) BIS Foundry Sand: 450.00 (100)
Water: 53.66
Potassium hydroxide: 0.50 (20)
Total Solids Content 78%, pH 11 to 12, Viscosity 3500–4000.

A foamed layer was formed which had good shear strength and did not readily crumble.

EXAMPLE 4

A latex mixture was formed from the following ingredients:

Carboxylated styrene-butadiene latex (V): 100.00 (48)
Sodium hexametaphosphate (IV): 1.00 (20)
Xanthan gum: 1.00 (4)
Sand 95 mesh (BS) BIS Foundry Sand: 1000.00 (100)
Sodium polyacrylate (VI): 1.00 (15)
Total Solids Content 80–82%, pH 8 to 9, Viscosity 10,000–12,000 cps.

The mixture was not foamed and was simply spread in conventional manner over the back surface of carpeting and then dried and cured by passing through an oven to give a flexible backing layer. The layer was readily flexible and did not tend to crumble or crack.

EXAMPLE 5

A foam material was made by a gel process from the following:

Styrene-butadiene rubber latex (I): 80.00 (65)
Natural rubber latex: 20.00 (60)
Potassium oleate (VII): 5.00 (40)
Sodium hexametaphosphate (IV): 1.00 (20)
Xanthan gum: 0.50 (4)
Hydroxy propyl methyl cellulose (VIII): 0.30 (2.5)
Sand 95 mesh (BS) BIS Foundry Sand: 150.00 (100)
Antioxidant: 1.00 (100)
Zinc diethyldithiocarbamate: 1.00 (50)
Mercaptobenzthiazole: 1.00 (50)
Sulphur: 2.00 (50)
Vulcafor EFA (IX): 0.75 (50)
Zinc oxide: 5.00 (50)
Ammonia: 2.5
Ammonium acetate (X): 2.88 (11.52)
Total Solids Content 70.62%, pH 11 to 12, Viscosity 4000–6000 cps.

The mixture was foamed, set, spread in conventional manner over the back surface of carpeting, then dried and cured in an oven, setting being caused by the heat activated gelling agent (ammonium acetate) rather than by drying. The gelling agent was added to the other ingredients immediately before use. The resulting flexible foamed layer had good shear strength and did not readily crumble.

EXAMPLE 6

A latex mixture was formed from the following ingredients:

Copolymer of vinyl acetate and ethylene (XI): 100.00 (57)
Sodium hexametaphosphate (IV): 0.50 (20)
Xanthan gum: 1.50 (4)

Sodium carboxymethyl cellulose (XII): 0.50 (2)
Sand 95 mesh (BS) BIS Foundry Sand: 400.00 (100)
Total Solids Content 78.47%, pH 7.5-8.5, Viscosity 6000-8000 cps.

The mixture was processed and used as in Example 4 and gave a flexible layer which did not tend to crumble or crack.

EXAMPLE 7

A latex mixture was formed from the following ingredients:

Polychloroprene latex (XIII): 100.00 (56)
Sodium hexametaphosphate (IV): 0.50 (20)
Xanthan gum: 1.00 (4)
Zinc oxide: 3.00 (50)
Sand 95 mesh (BS) BIS Foundry Sand: 400.00 (100)
Sodium polyacrylate (VI): 0.50 (15)
Total Solids Content 82.06%, pH 8.5-9.5, Viscosity 10,000-12,000 cps.

The mixture was processed and used as in Example 4 and gave a flexible layer which did not tend to crumble or crack.

EXAMPLE 8

A latex mixture was formed from the following ingredients:

Carboxylated styrene-butadiene latex (V): 100.00 (48)
Sodium hexametaphosphate (IV): 0.20 (20)
Sand 95 mesh: 250.00 (100)
Xanthan gum: 0.80 (4)
Ammonia: 4.00
Sodium lauryl Sulphate: 0.28 (28)
Water: 91.65
Sodium polyacrylate: 2.00 (15)
Total Solids Content 60-62%, pH 9 to 9.5, Viscosity 6000-8000 cps.

The mixture was lightly mechanically foamed and was spread over the back of pre-coated carpeting in conventional manner to form an adhesive layer. A jute backing fabric was pressed onto the layer. The adhesive was dried and cured by heating in an oven. Good adhesive properties resulted.

EXAMPLE 9

A foam material was made from the following ingredients using a non-gel process in accordance with the procedure of Example 1:

Carboxylated styrene-butadiene latex (XIV): 103.30 (57)
Sand 95 mesh (BS) BIS Foundry Sand: 350.00 (100)
Xanthan gum: 1.00 (4)
Hydroxy propyl methyl cellulose (XVI): 0.50 (2.5)
Ammonia: 0.25
Cross-linking system (XV): 10.90 (40.52)
Total Solids Content 77.19%, pH 9.0, Viscosity 10,000-15,000 cps.

The resulting foamed layer had good shear strength and did not readily crumble or crack.

The identified ingredients in the above Examples may be as follows:

I: Intex 131 trade name of ENI Chemicals
II: Wingstay L trade name of Goodyear Chemicals
III: Empimin MKK trade name of Albright & Wilson
IV: Calgon PT trade name of Albright & Wilson
V: Dow 891 trade name of Dow Chemical Co.
VI: Texigel SPA 12 trade name of Scott Bader Co.
VII: Fatty acid soap
VIII: Natrasol 250 HHR trade name of Hercules Powder Co.
IX: Condensation product of formaldehyde, ammonia and ethyl chloride. Brand name of Vulnax Limited
X: Gelling agent
XI: Vinamul 3252 trade name of Vinyl Products Ltd.
XII: Courlose A650 HDS trade name of Courtaulds
XIII: Neoprene latex 5475 trade name of Du Pont
XIV: Dow XZ 86471 trade name of Dow Chemical Co.
XV: Dow XZS 86859 specifically for use with XIV trade name of Dow Chemical Co.
XVI: Methocell 228 trade name of Dow Chemical Co.

With the foregoing Examples the mixed ingredients give physically stable fluent mixtures i.e. mixtures which can be stored (before incorporation of chemically reactive materials such as ammonium acetate, zinc oxide and sulphur) for say two weeks and can then be handled and pumped along supply lines without appreciable separation of ingredients or deposition of sand occurring. This stability is achieved despite the fact that very high proportions of filler are used compared with conventional limestone-filled mixtures and despite the fact that viscosities are maintained at the usual levels (i.e. manageable viscosities of the same order of those used with conventional limestone-filled mixtures). The stability derives from the particular sand/xanthan gum system.

With the structural layers the strength and resistance to crumbling and cracking on flexing is excellent and noticeably superior to such properties of comparable conventional limestone-filled materials.

Thus the Examples illustrate the surprising discovery that by modifying conventional limestone-filled polymeric materials by replacing the limestone with sand it is possible to obtain improved physical properties with a formulation which is less expensive yet which can be handled and processed in exactly the same manner as conventional limestone-containing formulations. It will therefore be understood that the invention is not intended to be restricted to the Examples and in particular can be applied to other formulations and ingredients (especially other polymers) and other processing techniques as used with conventional inorganic fillers such as limestone.

In support of the foregoing qualitative assessments of the materials produced with the above Examples, the following quantitative comparative tests were carried out.

Test 1

Three mixtures were made A, B and C as follows, parts being by weight and the solids content being in brackets.

| | A | B | C |
|---|---|---|---|
| Styrene-butadiene rubber latex (INTEX 131) | 100 (65) | same | same |
| Dialkyl sodium sulphosuccinamate (Empimin MKK) | 4.0 (35) | " | " |
| Antioxidant | 0.5 (100) | " | " |
| Sodium hexametaphosphate | 1.0 (100) | " | " |
| Zinc diethyldithiocarbamate | 0.75 (50) | " | " |
| Mercaptobenzthiazole | 0.25 (50) | " | " |

-continued

| | A | B | C |
|---|---|---|---|
| Sulphur | 2.0 (50) | " | " |
| Zinc oxide | 1.0 (50) | " | " |
| Potassium hydroxide | 0.2 (20) | " | " |
| Sodium lauryl sulphate | 0.5 (28) | " | " |
| Water | 20 | — | 15 |
| Limestone (Calmote) 200 mesh (BS) | 200 (100) | — | — |
| Hydroxy propyl methyl cellulose (Methocell 228) | 1.25 (25) | — | — |
| Xanthan gum | — | 1 (4) | 1.5 (4) |
| Sand 95 mesh (BS) BIS Foundry Sand | — | 200 (100) | 300 (100) |

In each case the total solids content was 77.75% and the viscosity was 4000–5000 cps and pH 10.5 to 11.5.

The three mixtures were subjected to the same mechanical foaming procedure and the density of the wet foam was determined (by determining the weight of material filling a standard cup). The foamed material was spread on a surface and dried and cured using the same procedure and cut to give foam strips of like dimensions. The tensile strength and elongation at break was measured using conventional apparatus. The results were as follows:

| Mixture | Density | Tensile strength (psi) | Elongation % |
|---|---|---|---|
| A | 205 gms/liter | 5.94 | 330.7 |
| B | 220 gms/liter | 9.37 | 462.36 |
| C | 220 gms/liter | 9.04 | 378.83 |

Test 2

An adhesive mixture (mixture D) was made up as follows:

Carboxylated styrene-butadiene latex (Dow 891): 100 (48)

Sodium hexametaphosphate: 0.2 (20)

Water: 49.56

Limestone: 150 (100)

Sodium polyacrylate: 1.5 (15)

Sodium lauryl sulphate: 0.28 (28)

Total Solids Content 60.75%, pH 9.0–9.5, Viscosity 6000–8000 cps.

It will be seen that this is closely similar to the mixture of Example 8 except for the substitution of limestone for sand.

A sample of mixture D and a sample of the mixture according to Example 8 (mixture E) were spread over separate samples of the same pre-coated carpeting to an amount of 150 gms/m$^2$ (dry weight) and a conventional jute backing was laminated to this. After drying and curing the jute backing was peeled away from the 2 inch (5.08 cms) strips of the carpeting and the required force to achieve this was measured. The results were:

Mixture D—3.00 Kgs

Mixture E—3.30 Kgs.

As stated it is an advantage of the invention that a high proportion of filler can be used whilst retaining acceptable physical properties. Thus, for example, in the context of a foamed material, in circumstances where conventionally a filler range up to 200 parts would be used, a filler content extending into a higher range, say 200 to 450 can be feasible. In the context of a non-foamed material, in circumstances where conventionally a filler range up to 400 would be used, a filler content extending into a higher range say 400 to 800 or even 400 to 1200 can be feasible.

It is, however, to be understood that the invention is not intended to be restricted exclusively to the use of very high proportions of filler and the filler content may be of any suitable level depending on requirements. Moreover it is to be understood that the filler need not be wholly sand but may comprise sand mixed with one or more other inorganic fillers e.g. limestone and whilst the sand is preferably the major constituent (i.e. at least 50% particularly at least 80% by weight of the filler) it is also possible depending on requirements to use a minor proportion of sand (say down to 20%).

Also, with regard to the xanthan gum, whilst this will preferably be present in the stated range of 0.1 to 3 parts per 100 parts polymer by weight, it may be possible to use a higher proportion, say in the range 0.1 to 8 or even 0.1 to 10 parts depending on requirements. Similarly, although the sand preferably has particles in the range 75 to 300μ, larger particles up to say 350μ or even 400μ might be feasible in some circumstances. Also, whilst preferably the sand particles are of a graded mesh size it may be possible to use particles of a mixture of sizes.

I claim:

1. A method of making a solid flexible polymeric material comprising the steps of:

mixing a water-based latex comprising an aqueous dispersion of one or more polymeric materials selected from natural rubber, styrene-butadiene rubber, carboxylated styrene-butadiene rubber, polyvinylchloride, ethylene vinylacetate copolymer, polychloroprene, acrylic copolymers, butadiene-acrylonitrile copolymer; with an inorganic filler comprising natural quartz sand having a graded particle size in the range 75 microns to 300 microns; and with xanthan gum in an amount of 0.1 to 8.0 parts per 100 parts polymer by weight;

whereby a fluent mixture is obtained containing the said inorganic filler as a stable dispersion therein; and solidifying the said mixture by setting the said latex.

2. A method of making a solid flexible polymeric material, comprising the steps of:

(a) mixing a water-based latex comprising an aqueous dispersion of one or more polymeric materials selected from the group consisting of natural rubber, styrene-butadiene rubber, carboxylated styrene-butadiene rubber, polyvinylchloride ethylene vinylacetate copolymer, polychloroprene, acrylic copolymers and butadiene-acrylonitrile copolymer with an inorganic filler comprising natural quartz sand having a graded particle size in the range of about 75 microns to about 300 microns and with xanthan gum in an amount of about 0.1 to about 8.0 parts per 100 parts polymer by weight, whereby a fluent mixture is obtained containing the said inorganic filler as a stable dispersion therein; and (b) applying the said mixture to a surface; and (c) solidifying the said mixture by setting the said latex to form a layer on the said surface.

3. A method of forming a solid flexible polymeric material wherein a water-based latex is mixed with an inorganic filler and xanthan gum and the latex mixture is then solidified, wherein said inorganic filler comprises sand, and wherein the latex mixture is foamed.

4. A method according to claim 3, wherein the latex mixture is applied to a surface and solidified to form a layer thereon.

5. A method according to claim 4, wherein the surface comprises a surface of a reinforcing scrim whereby the layer is formed integrally therewith.

6. A method according to claim 4, wherein the surface comprises a back surface of carpeting material whereby the layer forms an integral flexible backing.

7. A method according to claim 4, wherein the surface comprises a back surface of carpeting material and the latex mixture is disposed between such surface and a reinforcing fabric whereby said layer acts to bond said fabric to said carpeting material.

8. A method according to claim 3 where the proportion of sand amounts to 50 to 450 parts per 100 parts polymer by weight.

* * * * *